United States Patent
Shirakawa

(10) Patent No.: US 7,847,733 B2
(45) Date of Patent: Dec. 7, 2010

(54) DIRECTION-OF-ARRIVAL ESTIMATING DEVICE AND PROGRAM

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/812,467

(22) Filed: Jun. 19, 2007

(65) Prior Publication Data

US 2008/0122681 A1  May 29, 2008

Related U.S. Application Data

(63) Continuation of application No. PCT/JP2005/002600, filed on Feb. 18, 2005.

(30) Foreign Application Priority Data

Dec. 24, 2004  (WO) ................. PCT/JP2004/019388

(51) Int. Cl.
 *G01S 5/02* (2010.01)
(52) U.S. Cl. ..................................... 342/417
(58) Field of Classification Search ................... 342/417
See application file for complete search history.

(56) References Cited

U.S. PATENT DOCUMENTS

| | | | |
|---|---|---|---|
| 5,854,612 | A | 12/1998 | Kamiya et al. |
| 6,377,213 | B1 | 4/2002 | Odachi et al. |
| 6,446,025 | B1 | 9/2002 | Nakamura et al. |
| 6,642,888 | B2 | 11/2003 | Kishigami et al. |
| 6,836,245 | B2 | 12/2004 | Kishigami et al. |
| 7,333,056 | B2 * | 2/2008 | Kishigami et al. .......... 342/417 |
| 2004/0189523 | A1 * | 9/2004 | Kishigami et al. .......... 342/417 |

FOREIGN PATENT DOCUMENTS

| | | |
|---|---|---|
| JP | 9-219616 A | 8/1997 |
| JP | 10-229307 A | 8/1998 |
| JP | 11-133130 A | 5/1999 |
| JP | 11-281725 A | 10/1999 |
| JP | 11-289213 A | 10/1999 |
| JP | 2000-196328 A | 7/2000 |
| JP | 2002-243826 A | 8/2002 |

OTHER PUBLICATIONS

J. Xin, "Computationally Efficient Subspace-Based Method for Direction-of-Arrival Estimation Without Eigendecompostion" IEEE Transactions on Signal Processing vol. 52, No. 4 Apr. 2004, pp. 876-893.

* cited by examiner

*Primary Examiner*—Thomas H Tarcza
*Assistant Examiner*—Nga X Nguyen
(74) *Attorney, Agent, or Firm*—Hanify & King, P.C.

(57) ABSTRACT

An arriving direction estimating device for estimating the arriving direction of an arriving wave with high accuracy and at high speed by using a sensor array. The arriving direction estimating device comprises a receiving section for generating a baseband signal from the arriving signals received by sensors, a matrix creating section for creating a spatial average covariance matrix R by combining the correlation vector of the baseband signal, a projection matrix creating section for creating a projection matrix Q from the matrix R depending on the number of signals of the arriving signals, a scale matrix creating section for creating a scale matrix S from a partial matrix of the matrix R, and an estimating section for estimating the arriving direction of the arriving wave from the angle distribution or an algebraic equation by using $QS^{-1}Q^H$ defined using the projection matrix Q and the scale matrix S.

4 Claims, 10 Drawing Sheets

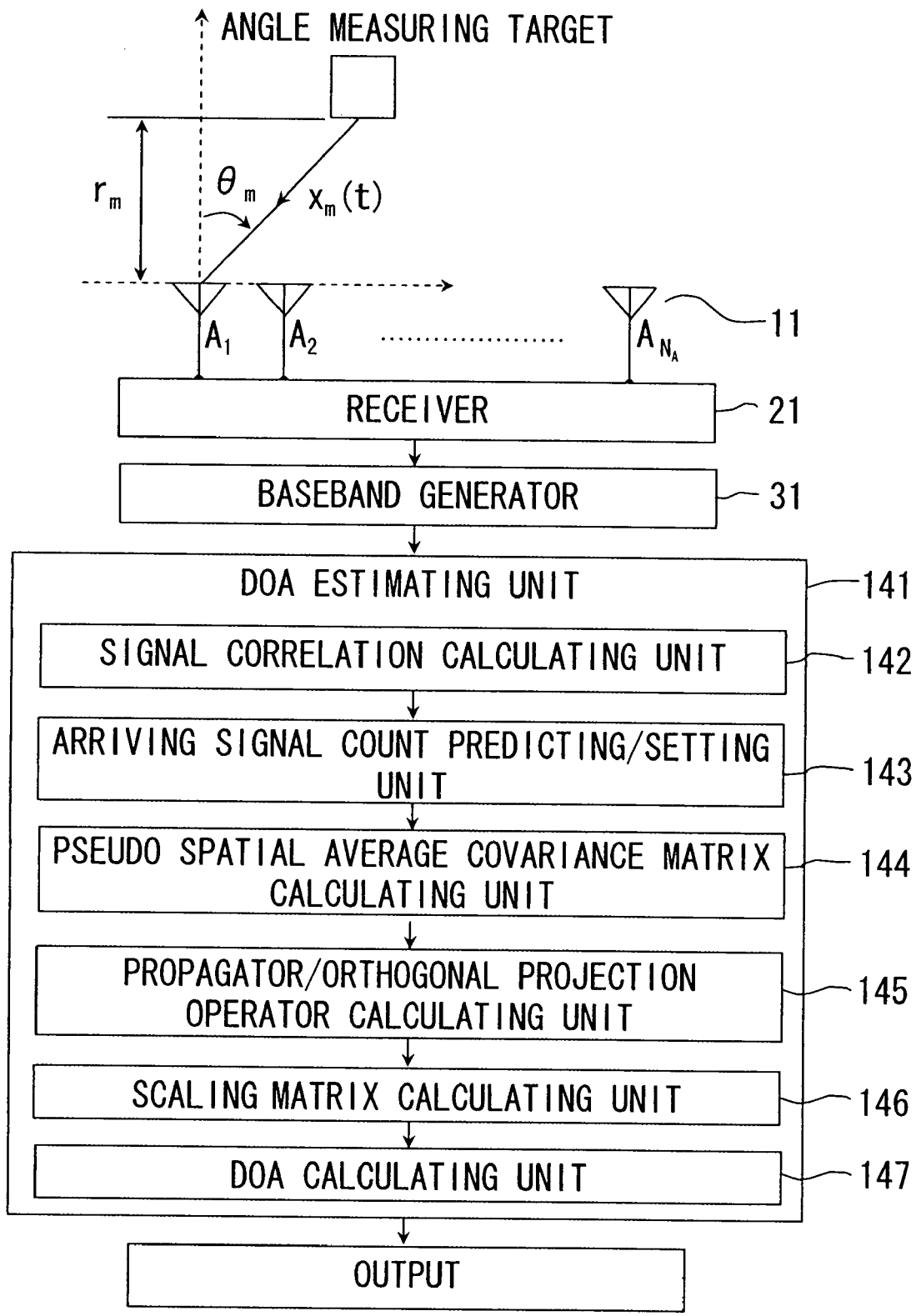

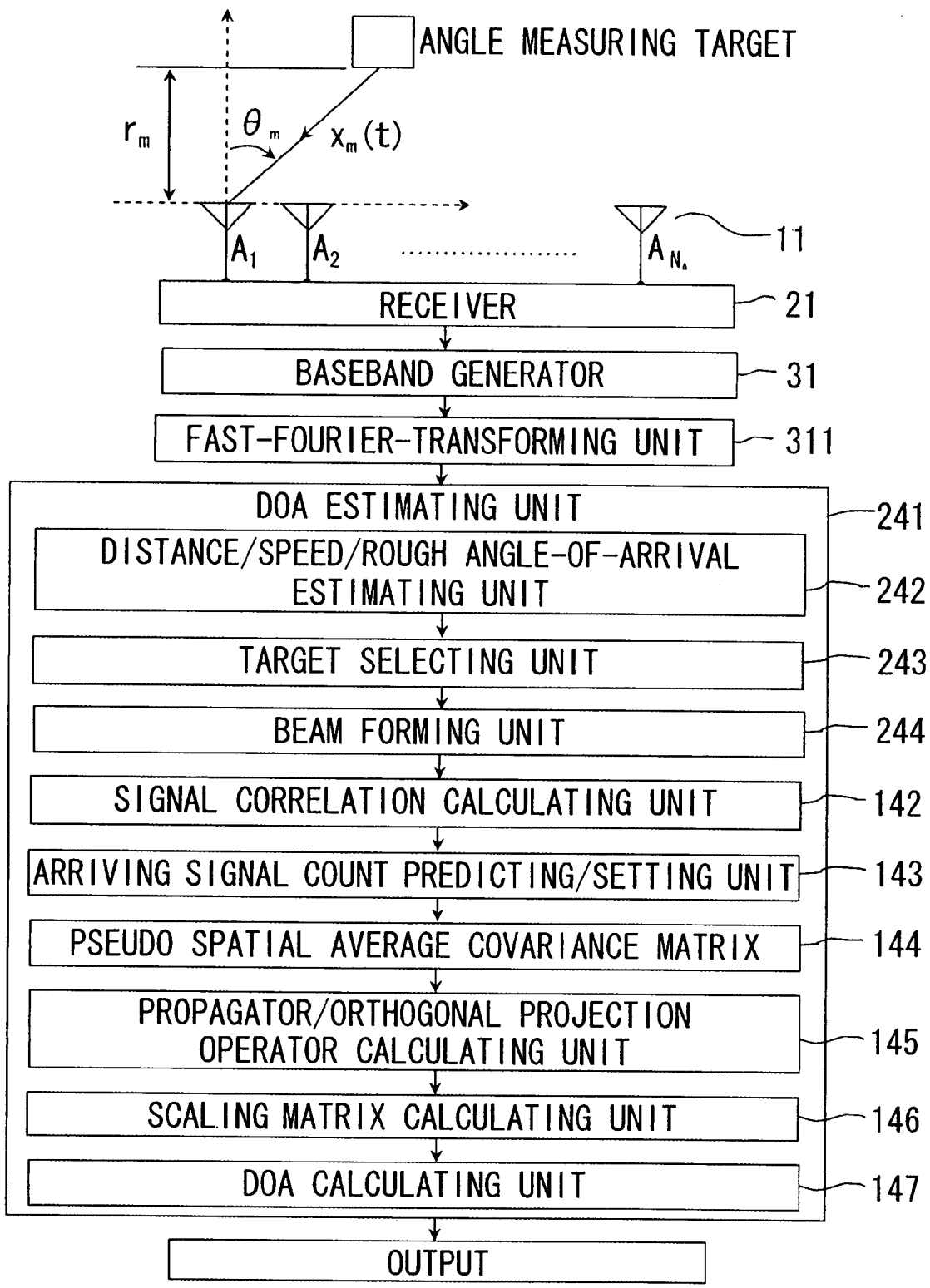

DIRECTION-OF-ARRIVAL ESTIMATING DEVICE AND PROGRAM

CROSS-REFERENCE TO RELATED APPLICATION

This is a continuation of Application PCT/JP2005/002600, filed on Feb. 18, 2005, now pending, the contents of which are herein wholly incorporated by reference.

BACKGROUND OF THE INVENTION

1. Field of the Present Invention

The present invention relates to a Direction-Of-Arrival estimating device that estimates arriving waves by use of a sensor array.

2. Description of the Related Art

The Direction-Of-Arrival (which will hereinafter be abbreviated to DOA) estimation using the sensor array is based on three typical well-known algorithms such as a digital-beam-former (which will hereinafter be abbreviated to DBF) method, an eigen-space-method (which will hereinafter be abbreviated to ESM) and a maximum-likelihood (which will hereinafter be abbreviated to ML) method.

The DBF method is typified by a CAPON method, a Linear Prediction method, etc. The ESM is typified by a MUSIC (Multiple Signal Classification) method, an ESPRIT (Estimation of Signal Parameters via Rotational Invariance Techniques) method and a Propagator method. Further, the ML method is typified by a MODE (Method of Direction Estimation) etc.

The algorithms given above have, however, a property that DOA estimation accuracy gets higher in the sequence such as DBF<ESM<ML, and on the other hand, along with this, a calculation quantity required for the DOA estimation becomes larger in the same sequence. With this property, in the case of considering the algorithm as, for example, an on-vehicle application, a clock of an on-vehicle CPU (Central Processing Unit) is on the order of 80 MHz at the maximum, and hence even implementation of the ESM requiring decomposition of an eigenvalue is difficult.

Proposed as a method of solving this difficulty is the Propagator method categorized as the ESM that does not require the decomposition of the eigenvalue or an Orthonormal Propagator Method (which will hereinafter be abbreviated to OPM) defined as an improved version of this Propagator method. It is, however, hard to say that those algorithms actualize the sufficient DOA estimation accuracy.

Herein, an explanation of how the DOA estimation is performed by the conventional DOA estimation device will be made with reference to FIG. 7 by exemplifying a case of a radar system constructed of linear array antennas. FIG. 7 illustrates a case in which $N_S$-pieces ($\leq N_A - 1$) of independent signals get incident at angles $\theta_m$ different from each other (which are based on a vertical direction of an antenna-axis (the Y-axis shown in FIG. 7) upon the linear array antennas having an antennal element count $N_A$ and an equal element interval d. "$X_m(t)$" represents a baseband component of the arriving signal from, e.g., an m-th target (m=1, ..., $N_S$), and "$v_n(t)$" represents an output signal obtained by demodulating an input signal in an n-th antenna element (n=1, ..., $N_A$).

At this time, the output signal $v_n(t)$ is expressed as by the following formula (1.1).

[Mathematical Expression 1]

$$v_n(t) = \sum_{m=1}^{N_S} x_m(t)\exp(j\phi_{n,m}) + n_n(t) \quad (1.1)$$

$$\phi_{n,m} \equiv \frac{2\pi}{\lambda}(n-1)d\sin\theta_m \quad (1.2)$$

In the formulae (1.1) and (1.2), "$n_n(t)$" represents a noise signal, "$\Phi_{n,m}$" represents a reception phase of an m-th wave in the element n when based on the element 1, and "$\lambda$" represents a wavelength of a carrier wave.

If these formulae are further expressed as vectors, the following formulae (1.3)-(1.6) are acquired.

[Mathematical Expression 2]

$$v(t) = \begin{bmatrix} \sum_{m=1}^{N_S} x_m(t)\exp(j\phi_{1,m}) + n_1(t) \\ \vdots \\ \sum_{m=1}^{N_S} x_m(t)\exp(j\phi_{N_A,m}) + n_{N_A}(t) \end{bmatrix} = Ax(t) + n(t) \quad (1.3)$$

$$A \equiv [a(\theta_1), \ldots, a(\theta_{N_S})] = \begin{bmatrix} \exp(j\phi_{1,1}) & \cdots & \exp(j\phi_{1,N_S}) \\ \vdots & & \vdots \\ \exp(j\phi_{N_A,1}) & \cdots & \exp(j\phi_{N_A,N_S}) \end{bmatrix} \quad (1.4)$$

$$x(t) \equiv [x_1(t) \cdots x_{N_S}(t)]^T \quad (1.5)$$

$$n(t) \equiv [n_1(t) \cdots n_{N_S}(t)]^T \quad (1.6)$$

In the formulae (1.3)-(1.6), "v(t)" represents an output signal vector, "x(t)" represents a baseband vector, "n(t)" represents a noise vector, "$a(\theta_m)$" represents a mode vector (direction vector), and "$^T$" represents transposition.

Then, supposing that there is no correlation between x(t) and n(t), when calculating covariance matrixes of v(t) from the formula (1.3), the matrixes are expressed by the following formulae (1.7) and (1.8).

[Mathematical Expression 3]

$$R_{vv} = E\{v(t)v^H(t)\} = AR_{xx}A^H + \sigma^2 I \quad (1.7)$$

$$R_{xx} = E[x(t)x^H(t)] \quad (1.8)$$

In the formulae given above, "$R_{vv}$" is the covariance matrix of ($N_A \times N_A$) dimensions, and "$R_{xx}$" is the covariance matrix of the baseband signal of ($N_S \times N_S$) dimensions. Further, "$E\{\cdot\}$" represents an expected value (ensemble or time average), "$^H$" represents complex conjugate transposition, "$\sigma^2 I$" represents a covariance matrix of the noise vector, "I" represents a unit matrix, and "$\sigma^2$" represents dispersion (noise electric power) of the noise vector n(t). Then, this covariance matrix $R_{vv}$ is the matrix of the basic DOA estimation target formula.

Thus, in the linear array antennas shown in FIG. 7, in the case of performing the DOA estimation by the DBF or the ESM, to begin with, it is required that the signal covariance matrix $R_{vv}$ of ($N_A \times N_A$) be calculated.

The signals received by the radar system are, however, nothing but the signals transmitted from the same signal source and reflected by the target, so that a rank of the covariance matrix $R_{vv}$ of $N_A \times N_A$ is $N_S$. Accordingly, even when performing an operation such as an inverse matrix operation and eigenvalue decomposition directly about $R_{vv}$, the covariance matrix $R_{vv}$ becomes a singular matrix and can not therefore be obtained proficiently. This leads to a difficulty that the DBF and the ESM are applied directly to the DOA estimation in the radar system. Further, the ML is the optimizing calculation in which singular value decomposition having a calculation load substantially proportional to $N_A^3$ is included in a loop, and hence the implementation is in fact difficult.

Such being the case, for obviating the problem, the prior art has a scheme to restore a hierarchy of the covariance matrix $R_{vv}$ by utilizing a spatial average method (which will hereinafter be referred to as Forward-Backward Spatial Smoothing (FBSS)) with respect to $R_{vv}$. The FBSS is the spatial average method that is a combined version of a Forward Spatial Smoothing (FSS) method of taking submatrixes ($N_A-N_P+1$ pieces of submatrixes can be acquired) of $N_P \times N_P$ in a main diagonal direction of $R_{vv}$, and adding and averaging the submatrixes, and a Backward Spatial Smoothing (BSS) method of performing the same operation by inverting an array reference point.

Then, the prior art implements the DOA estimation with respect to $R_{vv}^{FBSS}$ of $N_P \times N_P$ that is calculated by the spatial average method (FBSS) in a way that utilizes the CAPON method typified by the DBF and the MUSIC method typified by the ESM. The following formula (1.9) is a calculation formula of calculating an angle spectrum (angle distribution) based on the CAPON method.

[Mathematical Expression 4]

$$P_{CAPON}(\theta) = \frac{1}{a^H(\theta)[R_{vv}^{FBSS}]^{-1}a(\theta)} \quad (1.9)$$

The CAPON method involves, as shown in the formulae given above, calculating an angle spectrum $P_{CAPON}(\theta)$ from the covariance matrix $R_{vv}^{FBSS}$ and the mode vector $a(\theta)$, whereby the direction of arrival is estimated from a peak position when changing "$\theta$".

The following formulae (1.10) and (1.11) are calculation formulae of calculating the angle spectrum (angle distribution) by use of the MUSIC method.

[Mathematical Expression 5]

$$R_{vv}^{FBSS} = E_S \Lambda_S E_S^H + \sigma^2 E_N E_N^H \quad (1.10)$$

$$P_{MUSIC}(\theta) = \frac{a^H(\theta)a(\theta)}{a^H(\theta)E_N E_N^H a(\theta)} \quad (1.11)$$

In the MUSIC method, the angle spectrum $P_{MUSIC}(\theta)$ shown in the formula (1.11) is obtained by using a matrix $E_N$ acquired by conducting the eigenvalue decomposition of $R_{vv}^{FBSS}$ as shown in the formula (1.10). "$E_N$" represents the matrix formed by eigenvectors in a noise eigenspace, "$E_S$" represents a matrix formed by eigenvectors in a signal eigenspace, then, if $\theta$ is coincident with an angle-of-arrival $\theta_m$ of the arriving wave, a sharp peak appears in the angle spectrum $P_{MUSIC}(\theta)$, and the direction of arrival is estimated from a position of this peak.

Thus, the conventional DOA estimation method needs the operation of, at first, performing the multiplications ($N_A \times N_A$) times for forming $R_{vv}$, the operation of inverting the array reference point by the FBSS (($N_A \times N_A$) matrix is multiplied twice), the operation of adding the submatrixes $2(N_A-N_P-1)$ times, and the operation of conducting the eigenvalue decomposition of $R_{vv}^{FBSS}$.

Namely, the conventional DOA estimation methods using the sensor array include none of methods capable of performing the estimation at a high speed with high accuracy and with a small calculation quantity. In this type of conventional DOA estimation technology, an estimation method utilizing the BS-MUSIC method by use of the array antennas as a sensor array is proposed (refer to Patent document "Japanese Patent Application Laid-Open Publication No. 2000-196328").

SUMMARY OF THE INVENTION

It is an object of the present invention to provide a DOA estimation device capable of performing the DOA estimation of the arriving waves by use of the sensor array with the high accuracy at the high speed.

The present invention adopts the following configurations in order to solve the problems. Namely, the present invention is related to a direction-of-arrival estimation device comprising a plurality of sensors to receive arriving signals from an angle measuring target, a receiving unit generating baseband signals from the arriving signals received by the plurality of sensors, a matrix forming unit forming a spatial average covariance matrix R by combining correlation vectors of the baseband signals, and an estimation unit estimating a direction of arrival of the arriving signal from an angle distribution or an algebraic equation by use of $(RR^H)^{-1}$ (where "$H$" represents complex conjugate transposition, and "$-1$" represents an inverse matrix) based on the matrix R.

According to the present invention, the DOA estimation is implemented by use of $RR^H$ in place of the covariance matrix $R_{vv}^{FBSS}$ undergoing the spatial average that is used by the conventional DBF.

With this contrivance, according to the present invention, the DOA estimation, which is light of a calculation load and is affected small by noises, can be done.

Moreover, the present invention is related to a direction-of-arrival estimation device comprising a plurality of sensors to receive arriving signals from an angle measuring target; a receiving unit generating baseband signals from the arriving signals received by the plurality of sensors, a matrix forming unit forming a spatial average covariance matrix R by combining correlation vectors of the baseband signals, a projection matrix forming unit forming a projection matrix Q from the matrix R, corresponding to a signal count of the arriving signals, a scale matrix forming unit forming a scale matrix S from submatrixes of the matrix R, and an estimation unit estimating a direction of arrival of the arriving signal from an angle distribution or an algebraic equation by use of $QS^{-1}Q^H$ (where "$H$" represents complex conjugate transposition, and "$-1$" represents an inverse matrix) based on the projection matrix Q and the scale matrix S.

According to the present invention, the DOA estimation is implemented by use of $QS^{-1}Q^H$ in place of the inverse of the covariance matrix, $(R_{vv}^{FBSS})^{-1}$, undergoing the spatial average that is used by the conventional DBF.

With this contrivance, according to the present invention, the DOA estimation, which is light of the calculation load and has extremely high accuracy, can be actualized.

It should be noted that the present invention may also be a method making a computer actualize any one of the functions given above. Further, the present invention may also be a program that gets any one of these functions actualized. Still further, the present invention may also be a storage medium stored with such a program that can be read by the computer.

According to the present invention, it is possible to actualize the DOA estimation device capable of performing the DOA estimation of the arriving waves by use of the sensor array with the high accuracy at the high speed.

BRIEF DESCRIPTION OF THE DRAWINGS

FIG. 2 is a diagram of a functional configuration of the DOA estimation device in a second embodiment;

FIG. 8 is a diagram of a functional configuration of the DOA estimation device in a third embodiment.

DESCRIPTION OF THE PREFERRED EMBODIMENTS

A Direction-Of-Arrival (DOA) estimation device according to a best mode (which will hereinafter be termed an embodiment) for carrying out the present invention will hereinafter be described with reference to the drawings. Configurations in the following embodiments are exemplifications, and the present invention is not limited to the configurations in the embodiments.

First Embodiment

The DOA estimation device in a first embodiment of the present invention will hereinafter be described with reference to the drawings.

<Configuration of Device>

Figure 1:
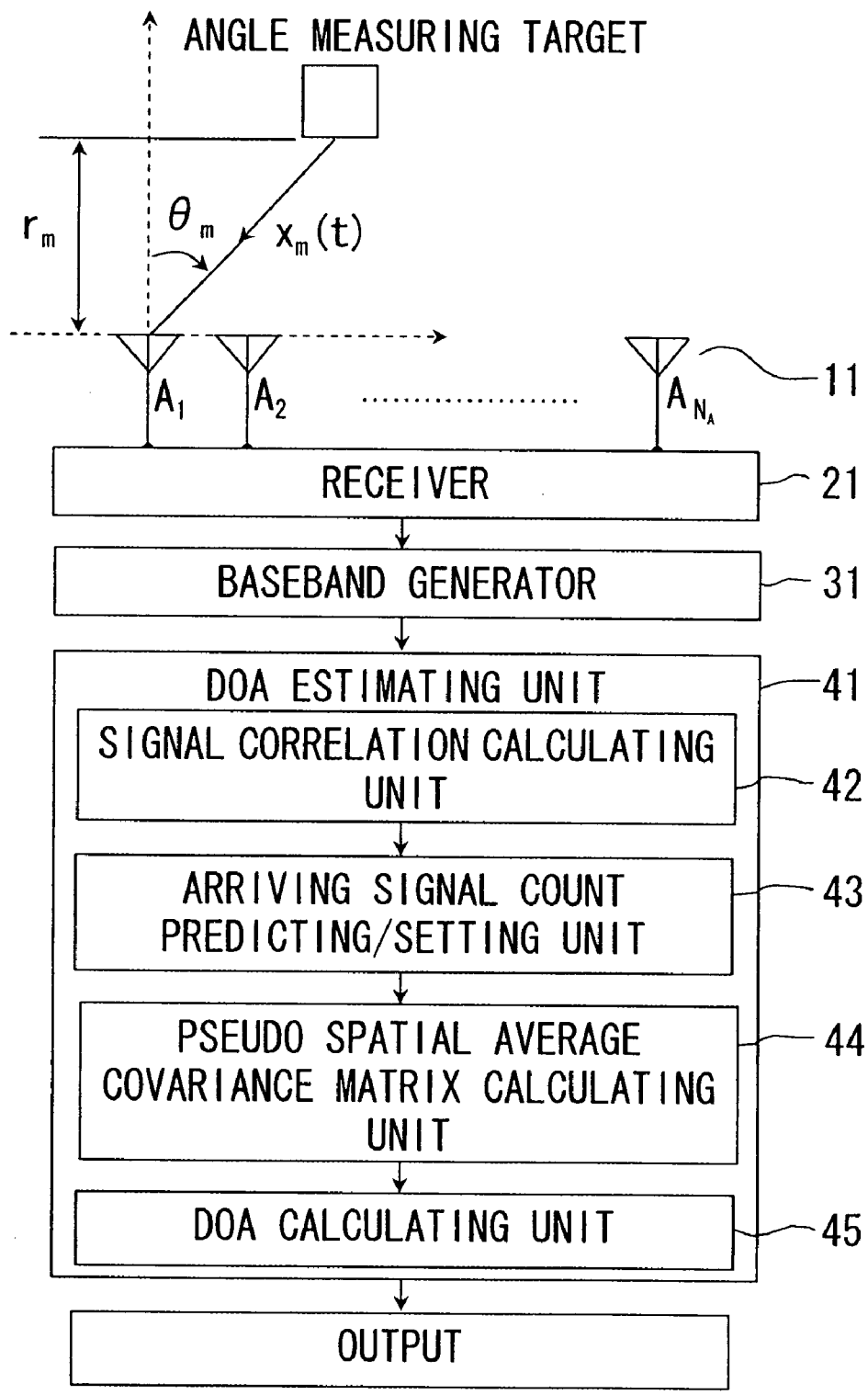
FIG. 1 is a diagram of a functional configuration of a DOA estimation device in a first embodiment.

FIG. 1 is a block diagram showing a functional configuration of the DOA estimation device in the first embodiment. The functional configuration of the DOA estimation device in the first embodiment will be explained with reference to FIG. 1. The DOA estimation device in the first embodiment is configured by including a sensor array 11, a receiver 21 (high frequencies, acoustic waves, etc), a baseband generator 31 (corresponding to a receiving unit according to the present invention) and a Direction-Of-Arrival (DOA) estimating unit 55 (DOA estimator) 41.

The sensor array 11 is built up by $N_A$-pieces of sensor elements $A_1$-$A_{NA}$. The sensor elements are arrayed linearly in, e.g., a single line, and respectively receive arriving signals (arriving waves). The received arriving waves are, after being processed by a baseband (BB) circuit etc within the baseband generator 31, undergo sampling with every predetermined sampling period and are converted into digital signals by an A/D converter within the baseband generator 31. Then, the baseband generator 31 generates baseband signals based on the converted digital signals, and outputs the baseband signals to the DOA estimating unit 41.

The DOA estimating unit 41, upon receiving the signals received by the respective sensor elements, with these signals being subjected to signal processing by the following respective functional units, estimates a direction of arrival (an angle of arrival) of the arriving wave. The DOA estimating unit 41 is constructed by including a signal correlation calculating unit 42, an arriving signal count predicting/setting unit 43 (corresponding to a signal count estimating unit according to the present invention), a pseudo spatial average covariance matrix calculating unit 44 (corresponding to a matrix forming unit according to the present invention) and a DOA calculating unit 45 (corresponding to an estimation unit according to the present invention). The respective functional units building up the DOA estimating unit 41 will hereinafter be described.

<<Signal Correlation Calculating Unit 42>>

The signal correlation calculating unit 42 calculates $R_{vv}$ in the formula (1.7) explained earlier from the inputted baseband signal. $R_{vv}$ represents an $(N_A \times N_A)$-dimension covariance matrix. The method of calculating $R_{vv}$ is the same as the method described above.

<<Arriving Signal Count Predicting/Setting Unit 43>>

The arriving signal count predicting/setting unit 43 predicts an arriving wave count and transfers the predicted arriving wave count to the following functional units. In the first embodiment, the predicted arriving wave count is assumed to be $N_s$. The prediction of the arriving wave count by the arriving signal count predicting/setting unit 43 involves utilizing AIC (Akaike Information Criteria) and MDL (Minimum Description Length), etc that are based on the maximum likelihood method.

<<Pseudo Spatial Average Covariance Matrix Calculating Unit 44>>

The pseudo spatial average covariance matrix calculating unit 44 obtains a pseudo spatial average covariance matrix R (corresponding to a spatial average covariance matrix according to the present invention) by use of the arriving wave count $N_s$ predicted by the arriving signal count predicting/setting unit 43. Herein, the pseudo spatial average covariance matrix R is a matrix obtained by the method (which will hereinafter be referred to as M-FBSS (Modified Forward-Backward Spatial Smoothing) disclosed in a document (IEEE Trans. On Signal Processing, Vol. 52, No. 4, 2004, pp. 876-893). According to the M-FBSS, the pseudo spatial average covariance matrix R is obtained by an algorithm that will be shown as below. The following M-FBSS-based algorithm is an outlined algorithm, and the details thereof are as disclosed in the document given above.

To begin with, correlation vectors $r_{v1}$, $r_{v2}$ of the baseband signals of the arriving waves are obtained by the following formula (2.1). Note that the vector elements may also be drawn from $R_{vv}$.

[Mathematical Expression 6]

$$r_{v1} = E[v(t)v^*_{N_A}(t)]$$

$$r_{v2} = E[v(t)v^*_1(t)] \quad (2.1)$$

In the formula (2.1) given above, v(t) represents signal vectors having elements $v_1(t)$ through $v_{N_A}(t)$ obtained by demodulating the arriving waves received by the sensor elements $A_1$-$A_{NA}$, $v_{N_A}^*(t)$ and $v_1^*(t)$ represent complex conjugates of the signals obtained by demodulating the arriving waves received by the sensor elements $A_{N_A}$, $A_1$, and $E[\cdot]$ represents an average.

Next, $R_{f1}$, $R_{f2}$, $R_{b1}$, and $R_{b2}$ are obtained by the following formulae (2.2) and (2.3).

[Mathematical Expression 7]

$$R_{f1} = \begin{pmatrix} r_{v1}^r(1) \\ \vdots \\ r_{v1}^r(N_A - N_S) \end{pmatrix}, R_{f2} = \begin{pmatrix} r_{v2}^r(2) \\ \vdots \\ r_{v2}^r(N_A - N_S + 1) \end{pmatrix} \quad (2.2)$$

$$R_{b1} = J_{N_A-N_S} R_{f2}^* J_{N_S}, \quad (2.3)$$
$$R_{b2} = J_{N_A-N_S} R_{f1}^* J_{N_S}$$

In the formula (2.3), $J_{NA-NS}$ represents an anti diagonal (unit) matrix having $N_A$–$N_S$ dimensions. Then, the matrixes of $R_{f1}$, $R_{f2}$, $R_{b1}$, and $R_{b2}$ obtained in the formula given above are further arranged, thereby acquiring a matrix R.

[Mathematical Expression 8]

$$R = (R_{f1} R_{f2} R_{b1} R_{b2}) \quad (25)$$

Note that the matrix R obtained in the formula (2.5) given above takes, it is understood from the formulae (2.2) and (2.3), a form such as $R_{f1}$=AX when taking the following formula (2.4) into consideration. Based on this point, the matrix R has, it is shown, the same information as the covariance matrix to which a spatial average is applied, and is therefore called a pseudo spatial average covariance matrix in the first embodiment.

[Mathematical Expression 9]

$$r_{v1}(k) = E\begin{pmatrix} v_k(t) v_{N_A}^*(t) \\ \vdots \\ v_{k+N_S-1}(t) v_{N_A}^*(t) \end{pmatrix}, \quad (2.4)$$
$$k = 1, \ldots, N_A - N_s$$

<<Direction-Of-Arrival Calculating Unit 45>>

The DOA calculating unit 45 estimates the direction of arrival (angle of arrival) of the arriving wave by use of the pseudo spatial average covariance matrix R obtained by the pseudo spatial average covariance matrix calculating unit 44.

The DOA calculating unit 45 calculates $(RR^H)^{-1}$ on the occasion of obtaining the direction of arrival. Herein, "$^H$" represents complex conjugate transposition, and "$^{-1}$" represents an inverse matrix. Then, the DOA calculating unit 45 estimates the direction of arrival by performing a scan of a mode vector in a way that applies the value obtained from the calculation of $(RR^H)^{-1}$ to the CAPON method. Herein, the DOA estimation using the CAPON method uses $RR^H$ as a substitute for a spatial average covariance matrix $R_{vv}^{FBSS}$ represented by the formula (1.9), and involves employing the following formula (3.1).

[Mathematical Expression 10]

$$P(\theta) = \frac{1}{a^H(\theta)[RR^H]^{-1} a(\theta)} \quad (3.1)$$

Further, the DOA calculating unit 45 may conduct the DOA estimation by solving an algebraic equation ($|a^H(RR^H)^{-1}a|=0$) without using an angle spectrum.

Operational Effect in First Embodiment

The DOA estimation device according to the first embodiment can execute the DOA estimation, which is light of a calculation load and is affected relatively small by noises, by use of $RR^H$ in place of the covariance matrix $R_{vv}^{FBSS}$ undergoing the spatial average that is employed in the conventional DBF.

Modified Example of First Embodiment

In the first embodiment of the present invention, the DOA calculating unit 45 obtains $(RR^H)^{-1}$ when estimating the direction of arrival. In the formula (2.6) in a second embodiment which will hereafter be described, however, $QS^{-1}Q^H$ is obtained by subtracting a first term of the right side of the formula (2.6) from $(RR^H)^{-1}$, and hence the DOA calculating unit 45 in the first embodiment may, when estimating the direction of arrival, use a value obtained by subtracting the first term of the right side of the formula (2.6) from $(RR^H)^{-1}$ (which corresponds to a first submatrix forming unit according to the present invention). In this case, a submatrix $R_1$ of $N_S \times 4N_S$ of the matrix R acquired by the pseudo spatial average covariance matrix calculating unit 44, is obtained, and the first term of the formula (2.6) may be obtained from this submatrix $R_1$. This operation enables the execution of the DOA estimation with higher accuracy than by the estimation using $(RR^H)^{-1}$.

Second Embodiment

The DOA estimation device according to the second embodiment of the present invention will hereinafter be described with reference to the drawings.

<Configuration of Device>

FIG. 2 is a block diagram showing a functional configuration of the DOA estimation device in the second embodiment. The functional configuration of the DOA estimation device in the second embodiment will be explained with reference to FIG. 2. The configuration of the DOA estimation device in the second embodiment has substantially the same functional units except a DOA estimating unit 141 as those in the first embodiment.

The DOA estimating unit 141, upon receiving reception signals corresponding to the arriving waves received by the respective sensor elements, with the signal processing being executed by the individual functional units that will be illustrated as below, thus estimates the direction of arrival (angle of arrival) of the arriving waves. The DOA estimating unit 141 is configured by including a signal correlation calculating unit 142, an arriving signal count predicting/setting unit 143, a pseudo spatial average covariance matrix calculating unit 144, a propagator/orthogonal projection operator calculating unit 145 (corresponding to a projection matrix forming unit, a first submatrix forming unit and a second submatrix forming unit according to the present invention), a scaling matrix calculating unit 146 (corresponding to a scaling matrix forming unit according to the present invention) and a DOA calculating unit 147 (corresponding to an estimation unit according to the present invention). The respective functional units building up the DOA estimating unit 141 will hereinafter be described. Note that the functions of the signal correlation calculating unit 142, the arriving signal count predicting/ setting unit 143 and the pseudo spatial average covariance matrix calculating unit 144 are the same as in the first embodiment, and hence their explanations are omitted.

<<Propagator/Orthogonal Projection Operator Calculating Unit 145>>

The propagator/orthogonal projection operator calculating unit 145, when receiving the pseudo spatial average covariance matrix R acquired by the pseudo spatial average covariance matrix calculating unit 144, obtains a projection matrix Q from the matrix R corresponding to the arriving wave count $N_s$. A method by which the propagator/orthogonal projection operator calculating unit 145 obtains the projection matrix Q will hereinafter be described. The propagator/orthogonal projection operator calculating unit 145 divides the matrix R into a matrix $R_1$ of ($N_S \times 4N_S$) and a matrix $R_2$, of (($N_A$-$2N_S$)$\times 4N_S$), and obtains the Q in relation to $(RR^H)^{-1}$ by using the following method. It is to be noted that in the following formula (2.6), the formula (2.6.2) is obtained from the formula (2.6.1) by applying the Inverse Matrix Theorem.

Herein, "I" in the formula (2.8) is the unit matrix. Of course, the propagator/orthogonal projection operator calculating unit 145 may directly calculate Q by applying formula (2.8) to submatrices A and B.

<<Scaling Matrix Calculating Unit 146>>

The scaling matrix calculating unit 146 obtains $S^{-1}$ based on the matrix S acquired by the propagator/orthogonal projection operator calculating unit 145. Herein, "$^{-1}$" represents the inverse matrix. At this time, the scaling matrix calculating unit 146 utilizes the formulae (2.6) and (2.7) given above. It is needless to say that the scaling matrix calculating unit 146 may directly calculate Q by applying formula (2.7) to submatrices A, B and D.

<<DOA Calculating Unit 147>>

The DOA calculating unit 147 generates a matrix $QS^{-1}Q^H$ by use of the matrix Q obtained by the propagator/orthogonal projection operator calculating unit 145 and the inverse

[Mathematical Expression 11]

$$(RR^H)^{-1} = \left[\begin{pmatrix} R_1 \\ R_2 \end{pmatrix}(R_1^H \quad R_2^H)\right]^{-1} \quad (2.6.1)$$

$$= \begin{bmatrix} R_1 R_1^H & R_1 R_2^H \\ R_2 R_1^H & R_2 R_2^H \end{bmatrix}^{-1}$$

$$\equiv \begin{bmatrix} A & B \\ B^H & D \end{bmatrix}^{-1}$$

$$= \begin{bmatrix} A^{-1} + A^{-1}B(D - B^H A^{-1}B)^{-1}(A^{-1}B)^H & -A^{-1}B(D - B^H A^{-1}B)^{-1} \\ -(D - B^H A^{-1}B)^{-1}(A^{-1}B)^H & (D - B^H A^{-1}B)^{-1} \end{bmatrix} \quad (2.6.2)$$

$$= \begin{bmatrix} A^{-1} & 0 \\ 0 & 0 \end{bmatrix} + \begin{bmatrix} A^{-1}B(D - B^H A^{-1}B)^{-1}(A^{-1}B)^H & -A^{-1}B(D - B^H A^{-1}B)^{-1} \\ -(D - B^H A^{-1}B)^{-1}(A^{-1}B)^H & (D - B^H A^{-1}B)^{-1} \end{bmatrix}$$

$$= \begin{bmatrix} A^{-1} & 0 \\ 0 & 0 \end{bmatrix} + \begin{bmatrix} A^{-1}B(D - B^H A^{-1}B)^{-1}(A^{-1}B)^H & A^{-1}B(D - B^H A^{-1}B)^{-1}(-I)^H \\ -I(D - B^H A^{-1}B)^{-1}(A^{-1}B)^H & -I(D - B^H A^{-1}B)^{-1}(-I)^H \end{bmatrix}$$

$$= \begin{bmatrix} A^{-1} & 0 \\ 0 & 0 \end{bmatrix} + \begin{bmatrix} A^{-1}B \\ -I \end{bmatrix}(D - B^H A^{-1}B)^{-1}\left[(A^{-1}B)^H \quad (-I)^H\right]$$

$$= \begin{bmatrix} A^{-1} & 0 \\ 0 & 0 \end{bmatrix} + QS^{-1}Q^H \quad (2.6)$$

As understood from the formula (2.6) given above, the matrixes S and Q are defined by the following formulae.

[Mathematical Expression 12]

$$S = D - B^H A^{-1} B \quad (2.7)$$

$$Q = \begin{bmatrix} A^{-1}B \\ -I \end{bmatrix} \quad (2.8)$$

matrix $S^{-1}$ obtained by the scaling matrix calculating unit 146, and estimates the direction of arrival (angle of arrival). "$^H$" represents the complex conjugate transposition. The DOA calculating unit 147 performs a scan of a mode vector a(θ) in a way that uses the matrix $QS^{-1}Q^H$ to, e.g. a PROPAGATOR method (Document: IEEE Trans. on Signal Processing, Vol. 39, No. 3, 1991, pp. 746-749), and estimates the direction of arrival. In the DOA estimating employing the PROPAGATOR method, $QS^{-1}Q^H$ is used as a substitute for $QQ^H$ shown in the following formula (2.9) (refer to the formula (2.10)). The DOA calculating unit 147 may conduct the DOA estimation by solving an algebraic equation ($|a^H QS^{-1}Q^H a|=0$) without using the angle spectrum.

[Mathematical Expression 13]

$$P_{PROPAGATOR}(\theta) = \frac{1}{a^H(\theta)[QQ^H]a(\theta)} \quad (2.9)$$

$$P(\theta) = \frac{1}{a^H(\theta)QS^{-1}Q^H a(\theta)} \quad (2.10)$$

Discussion on DOA Estimation in Second Embodiment

The DOA estimation device in the second embodiment conducts the DOA estimation using the concept of the PROPAGATOR method. Then, the DOA calculating unit 147 in the second embodiment makes the use of the formula (2.10) in which $QS^{-1}Q^H$ is used as the substitute for $QQ^H$ according to the PROPAGATOR method.

Considering herein the formula (2.6) in which $(RR^H)^{-1}$ is developed for comparing the first embodiment with the second embodiment that will be discussed next, the first term is formed by information corresponding to a signal subspace itself. Accordingly, to give a consideration in terms of orthogonality with respect to the angle vector and the noise subspace, the second embodiment takes an accuracy-improved mode of the first embodiment.

Further, supposing that $S^{-1}$ is capable of eigenvalue decomposition as shown in the following formula (2.11), the formula (2.12) is obtained if using the second term $QS^{-1}Q^H$ of the formula (2.6) in place of $QQ^H$ of the formula (2.9). At this time, an eigenvalue $\sigma_i$ represents an inverse number of signal power.

[Mathematical Expression 14]

$$S^{-1} = E\Sigma E^H = \sum \sigma_i e_i e_i^H \quad (2.11)$$

$$P(\theta) = \frac{1}{a^H(\theta)QS^{-1}Q^H a(\theta)} = \frac{1}{\sum \sigma_i |a^H(\theta)Qe_i|^2} \quad (2.12)$$

Based on the formulae (2.11) and (2.12) given above, to give an explanation by exemplifying a case of a radar, in a position where the target does not exist, all of the elements of the matrixes $R_1$, $R_2$ are approximate to zero ($\approx 0$), and hence the matrix S is given such as $S \approx 0$ irrespective of the angle information and is, it is understood, a matrix similar to a singular matrix. Namely, $a^H(\theta)Qe_i$ takes a fixed value, and besides, as far as none of the arriving wave signals exist, the eigenvalue $\sigma_i$ becomes an extremely large value, with the result that $P(\theta)$ becomes small.

While on the other hand, in a position where the target exists, since the relationship of $S \approx 0$ is still established, the matrix S is the matrix similar to the singular matrix, however, at the same time, $a^H(\theta)Q$ gets approximate to 0 (PROPAGATOR), and, so far as the arriving signals exist, the eigenvalue $\sigma_i$ becomes small, with the result that a peak occurs in $P(\theta)$.

As a result, unlike a normal eigenspace method including the normal PROPAGATOR, it hardly happens that a pseudo peak occurs other than the angle at which the target truly exists, and besides, it follows that the peak corresponding to the target occurs extremely sharply because of a scaling effect of the $S^{-1}$.

Operational Effect in Second Embodiment

The DOA estimation device according to the second embodiment conducts the DOA estimation by performing the scan of the angle spectrum in a way that uses $QS^{-1}Q^H$ defined in the formula (2.6) instead of the inverse of the covariance matrix, $(R_{vv}^{FBSS})^{-1}$, undergoing the spatial average that is used in the conventional DBF. Alternatively, the DOA estimation is done by solving the algebraic equation $(|a^H QS^{-1}Q^H a|=0)$.

With this operation, in the second embodiment, it is possible to actualize the DOA estimation having a combination of three types of characteristics such as an M-FBSS characteristic that the calculation load is light while being affected small by the noises, a characteristic of the PROPAGATOR method that there is no necessity of calculating the eigenvector though categorized as the subspace method, and a DBF-wise characteristic that the pseudo peak other than the position where the angle measuring target exists is suppressed by $S^{-1}$.

Modified Example of Second Embodiment

In the second embodiment of the present invention, the DOA calculating unit 147, though $QS^{-1}Q^H$ is obtained when estimating the direction of arrival, may obtain $QQ^H$ instead.

Similarly, the DOA estimation device may estimate the angle of arrival by use of any one of the following formulae using a matrix A, a matrix B, a matrix D and the matrix S of the formula (2.6) (including the formulae (2.6.1) and (2.6.2)), (2.7) and (2.8) in place of $QS^{-1}Q^H$ in the second embodiment of the present invention.

$$Q(W)^{-1}Q^H \quad \text{Formula (3.1)}$$

$$(\text{norm}(Z)/M)^I QQ^H, (\text{norm}(\text{abs}(Z))/M)^I QQ^H \quad \text{Formula (3.2)}$$

$$Q(\theta W + (1-\theta)(\text{norm}(Z)/M)^I U)^{-1} Q^H, Q(\theta W + (1-\theta)(\text{norm}(\text{abs}(Z))/M)^I U)^{-1} Q^H \quad \text{Formula (3.3)}$$

The matrix W is expressed by S, D, SD, DS, $B^H A^{-1} B$, $SB^H A^{-1} B$, $B^H A^{-1} BS$, $B^H B$, $SB^H B$, $B^H BS$, $D-B^H B$, $S(D-B^H B)$, $(D-B^H B)S$, $Q^H Q$, $SQ^H Q$, $Q^H QS$ using the matrix A, the matrix B, the matrix D and the matrix S, or alternatively by products of the terms thereof and products of the inverse matrixes thereof.

Further, Z represents (1×1) or more submatrixes, scalar or vector of the pseudo spatial average covariance matrix R or the matrix W. The matrix U has the same dimension L as the matrix S has, and is defined as a weight-oriented matrix having one or more matrix elements excluding 0.

"I" is a real number, $\theta$ is a constant defined such as $0 \leq \theta \leq 1$, and M is a 1 or larger integer that is in principle equal to a rank of Z. Values of I and $\theta$ are set beforehand corresponding to an environment etc in which to implement the DOA estimation, and are stored in a ROM (Read Only Memory) etc. Note that the values of I and $\theta$ may also be set and changed based on the result of the DOA estimation in accordance with required accuracy etc of the DOA estimation. The real number I involves using a numerical value such as −1 and 2.

Given hereinafter are explanations of abs( ) and norm( ) in the formulae given above, which are expressed by the array A where the scalar, the vector and the matrix are generically termed.

"abs(A)" is a array having magnitudes of the respective elements of the matrix as elements thereof.

"norm(A)" represents, when A is the matrix, any one of 1-norm, 2-norm, infinite norm and Frobenius-norm of the matrix A (as to the norm, refer to the formula (3.5) expressing p-norm of the matrix A and the formula (3.6) expressing p-norm of the vector x). Further, when A is the matrix, norm (A) may take a maximum column sum "max(sum(abs(A)))" in place of 1-norm, a maximum singular value in place of 2-norm and a maximum row sum "max(sum(abs($A^H$)))" in place of infinite norm. Still further, when A is the vector, norm(A) represents any one of sum(abs(A).^p)^(1/p), max (abs(A)) and min(abs(A)) with respect to an arbitrary value of $1 \leq p \leq \infty$. Yet further, when A is the scalar, norm(A) represents sum(abs(A).^p)^(1/p) with respect to an arbitrary value of $1 \leq p \leq \infty$.

Herein, sum(A) is the row vector (or scalar) having the element sum of the A's column vector as a component. "max (A)" and "min(A)" are the maximum element and the minimum element of the matrix A. "A.^p" represents the matrix having a value into which each of the A's elements is raised to the p-th power as a element.

Note that when Z is a square matrix in the formulae (3.2) and (3.3), norm( ) may also be replaced by trace( ) shown in the following formula (3.7).

[Mathematical Expression 15]

$$\|A\|_P = \max_x \frac{\|Ax\|_P}{\|x\|_P} \quad (3.5)$$

$$\|x\|_P = \left(\sum_x |x_i|^P\right)^{1/P} \quad (3.6)$$

$$\text{trace}(A) = \sum_{i=1}^{L} A_{ii} \quad (3.7)$$

Operational Effect in Modified Example of Second Embodiment

When the DOA calculating unit 147 estimates the direction of arrival, the matrix calculation count can be reduced depending on how the combination is made by use of the formulae (3.1), (3.2) and (3.3), to which degree the processes required for the DOA estimation can be decreased. Hence, the DOA estimation device in the modified example can implement the DOA estimation at a high speed. Particularly in the case of employing the formula (3.2), the calculation can be attained only by a product of the two matrixes, and therefore the higher DOA estimation can be actualized. Moreover, in the case of using the formula (3.3), performance of the DOA estimation can be adjusted corresponding to the environment such as the measuring target and the weather by changing the predetermined value θ, and hence such an advantage is yielded that the flexible device can be actualized.

Modified Examples of First Embodiment and Second Embodiment

The first embodiment and the second embodiment use, as the components of the DOA estimation device, the signal correlation calculating unit 42 (142) and the arriving signal count predicting/setting unit 43 (143) for predicting the arriving wave count $N_s$, however, the arriving wave count $N_s$ may be set as a predetermined fixed value. Furthermore, the arriving wave count $N_s$ may be estimated using a characteristic value derived from matrix R.

The DOA estimation method using the DOA estimating unit 41 (141), though having theoretically an eigenspace-method-wise aspect, is also considered to be the DBF using $RR^H$ in place of $R_{vv}^{FBSS}$ in a formal sense. Accordingly, if construed in terms of the latter point of view, the value of $N_s$ has a significance in only one point of forming the optimum spatial average matrix, and hence, for example, the arriving wave count $N_s$ may also be fixed to a maximum measuring angle target count detectable by use of the matrix R obtained by pseudo-spatial-averaging the signals sent from the sensor array 11.

Figure 5:
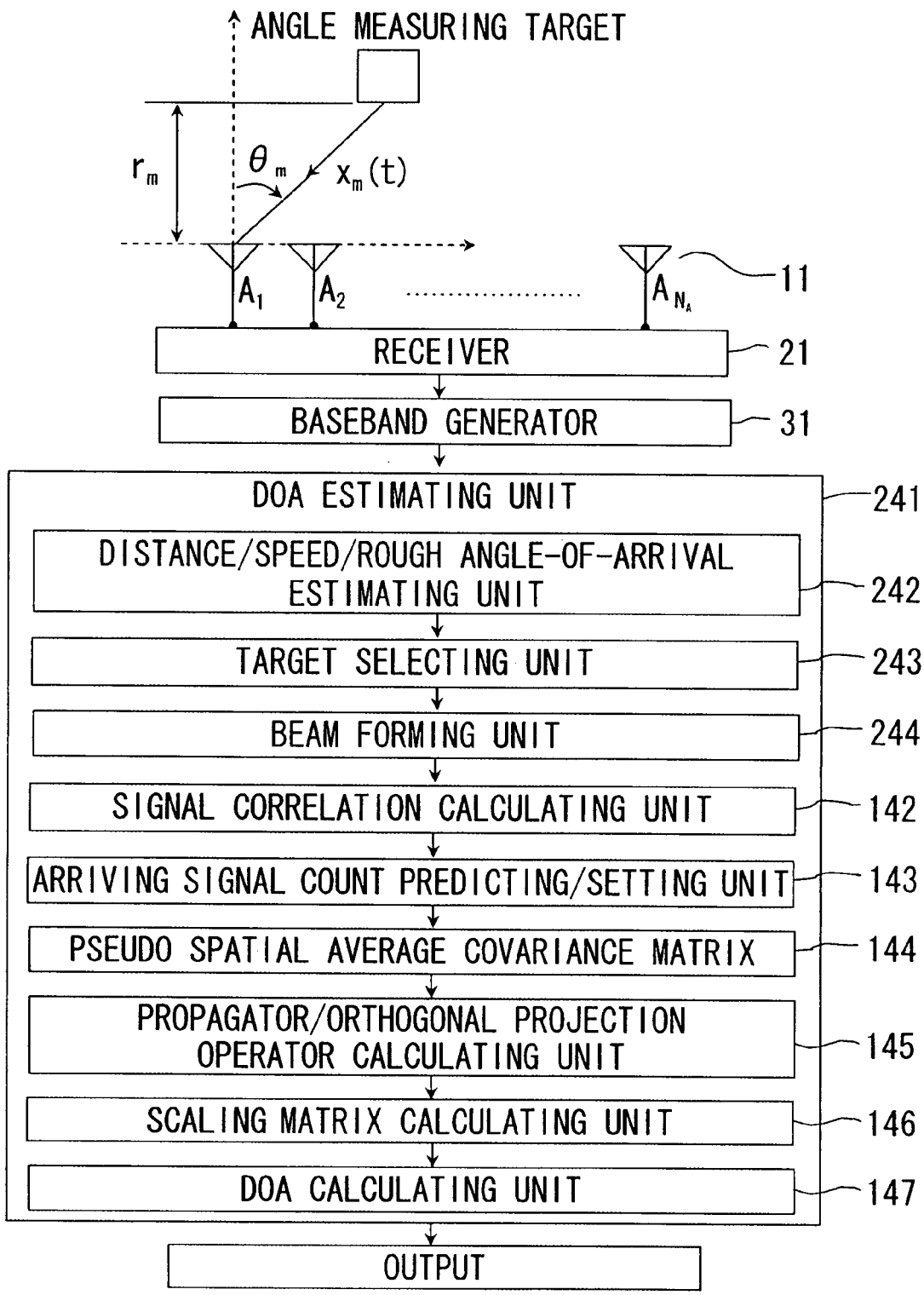
FIG. 5 is a diagram of a functional configuration of the DOA estimation device in a modified example of the second embodiment.

Further, before the DOA estimating unit 41 (141) in the first embodiment and the second embodiment implements the DOA estimation in depth, a specified target is narrowed down from the plurality of measuring angle targets, and this specified target may also undergo the simple DOA estimation (which will hereinafter be referred to as a mode added a rough DOA estimating function). The DOA estimation device shown in FIG. 5 actualizes a mode added the rough DOA estimating function by providing a distance/speed/rough angle-of-arrival estimating unit 242, a target selecting unit 243 and a beam forming unit 244 (which correspond a position estimating unit according to the present invention) in front of the signal correlation calculating unit 142 of the DOA estimating unit 141 in the functional configuration of the second embodiment.

For instance, the distance/speed/rough angle-of-arrival estimating unit 242, when receiving the baseband signal, calculates a distance and a speed of the angle measuring target by fast-Fourier-transforming this baseband signal (which will hereinafter be abbreviated to FFT). The target selecting unit 243 selects a target as the target having DOA that should be obtained this time from pieces of information on the distance and the speed of the calculated angle measuring target. For example, in a radar system, the target selecting unit 243 may select the fast-moving target existing at the nearest distance from the plurality of targets. Then, using a beam-space method, the first embodiment of the present invention, or the DBF, etc., the beam forming unit 244 determines a rough direction of arrival of the arriving wave from the selected target.

Based on the thus-determined rough DOA information, the in-depth DOA estimation in the second embodiment is implemented, whereby the DOA estimation taking account of the operating environment etc can be attained. The modified example discussed above has exemplified the mode added the rough DOA estimating function in the second embodiment, however, the same effect can be acquired by adding the beam forming unit based on the beam-space method or the DBF, etc in the first embodiment.

Third Embodiment

The DOA estimation device in a third embodiment of the present invention will hereinafter be described with reference to the drawings.

<Configuration of Device>

FIG. 8 is a block diagram showing a functional configuration of the DOA estimation device in the third embodiment. The functional configuration of the DOA estimation device in the third embodiment will be explained with reference to FIG. 8. The configuration of the DOA estimation device illustrated in FIG. 8 is that a fast-Fourier-transforming unit 311 is added to the functional configuration in the second embodiment.

The third embodiment has substantially the same functional units except the fast-Fourier-transforming unit 311 as those in the second embodiment. To be specific, the DOA estimating units 41 and 141 in the first embodiment and the second embodiment execute the DOA estimating process by use of the time domain signals inputted from the baseband generator 31, however, the DOA estimating unit according to the third embodiment executes the DOA estimating process by use of signals converted into frequency domain signals.

<<Fast-Fourier-Transforming Unit 311>>

The fast-Fourier-transforming unit 311 is a functional unit that fast-Fourier-transforms (abbreviated to FFT) the baseband signal inputted from the baseband generator 31. The signal inputted from the baseband generator 31 is the time domain signal, and hence the fast-Fourier-transforming unit 311 converts the time domain signal into the frequency domain signal. With this conversion, for instance, when the signal is a radar signal, the post-converting signal is a signal in a format in which the distance information and the speed information are directly reflected.

The fast-Fourier-transforming unit 311 outputs the signal converted into the frequency domain signal to the DOA estimating unit 241. The DOA estimating unit 241 executes the DOA estimating process in the same way as in the second embodiment by use of the signal converted into the frequency domain signal. It should be noted that the formulae using the time axis in the formulae (2.1) through (2.6), and thus succeeding formulae (2.7) through (2.12), used in the second embodiment are replaced the time axis with the frequency axis and are utilized.

Operational Effect in Third Embodiment

In the third embodiment, the fast-Fourier-transforming unit 311 applies the fast-Fourier-transform (integrating operation) to the time domain signal. An S/N ratio of the signal utilized for the DOA estimation is thereby improved. Further, a scale in the frequency domain is directly reflected in the matrix S obtained by the scaling matrix calculating unit 146 by use of the frequency domain signal.

An effect of the DOA estimation device in the third embodiment will hereinafter be described in conjunction with the discussion developed in the second embodiment. FIG. 3 illustrates, by way of examples for actually proving the present "Effects of the invention", results of calculating the DOA by the respective methods in a way that measures the data in the case of using a radar apparatus and placing two targets separated at 0 to 3 degrees at a 40 m-distance. In FIG. 3, the X-axis (axis of abscissa) represents the angle, the Y-axis (axis of ordinate) represents the distance (bin), and the Z-axis (color (density) illustrated in FIG. 3) represents the spectrum.

Figure 3A:
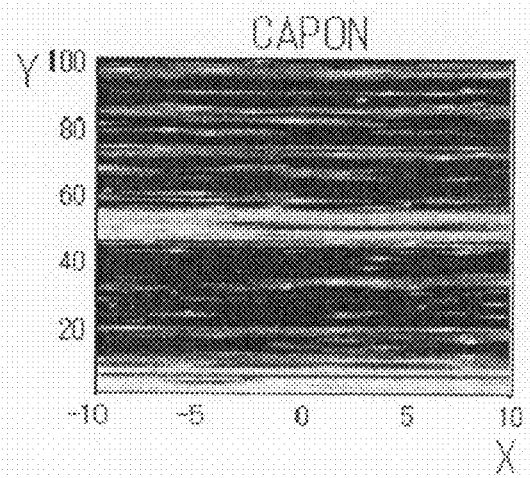
FIGS. 3(A)-3(H) are diagrams of three-dimensional angle distributions showing results of the DOA estimations according to the prior art and the present invention.
Figure 3B:
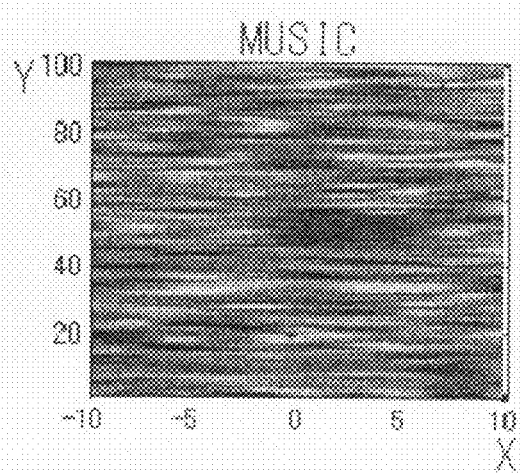
Figure 3C:
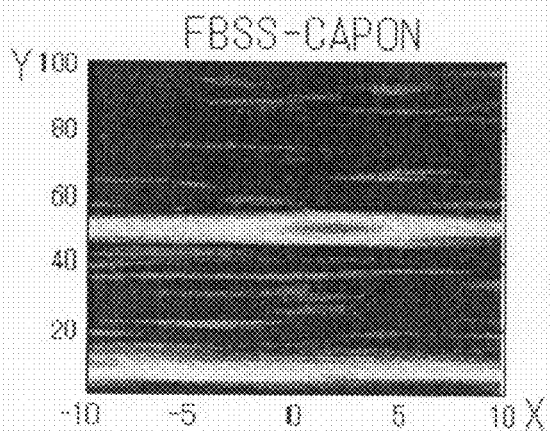
Figure 3D:
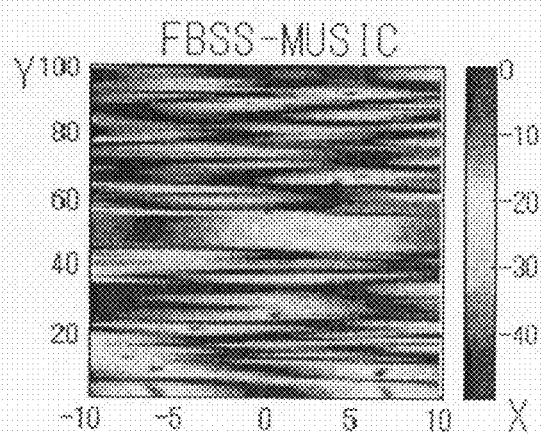

FIG. 3(A) shows the result given by the CAPON method, FIG. 3(B) shows the result given by the MUSIC method, FIG. 3(C) shows the result given by the CAPON method using FBSS (which is shown as FBSS-CAPON) shown in the formula (1.9), and FIG. 3(D) shows the result given by the MUSIC method using FBSS (which is shown as FBSS-MUSIC). It is recognized that the methods using the graphs illustrated in FIGS. 3(A) through 3(D) are simply capable of specifying existing areas (which are black portions surrounded by white portions) of fuzzy targets in a range of 40 m through 50 m at 0 degree through 5 degrees according to the FBSS-CAPON method, while other methods can specify almost none of the existing areas (the black portions surrounded by the white portions are not specified).

Figure 3E:
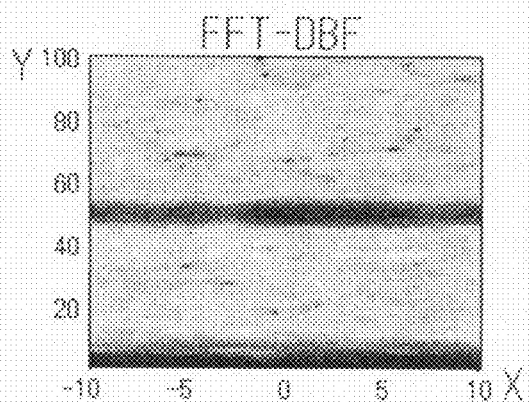
Figure 3F:
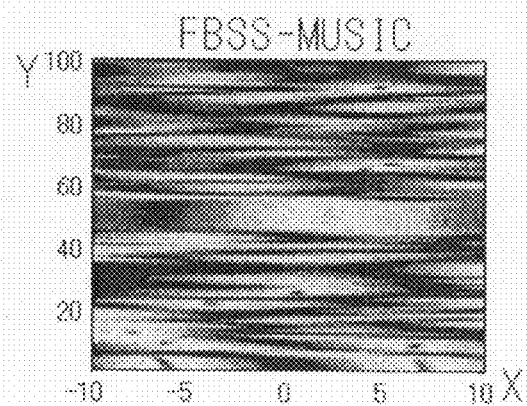
Figure 3G:
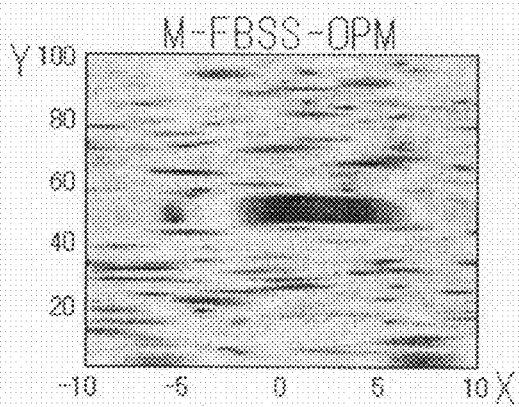
Figure 3H:
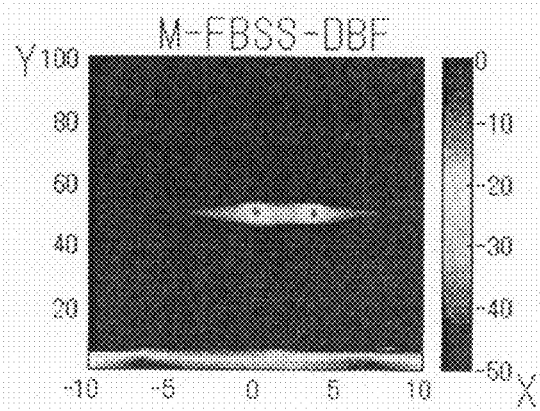
Figure 4A:
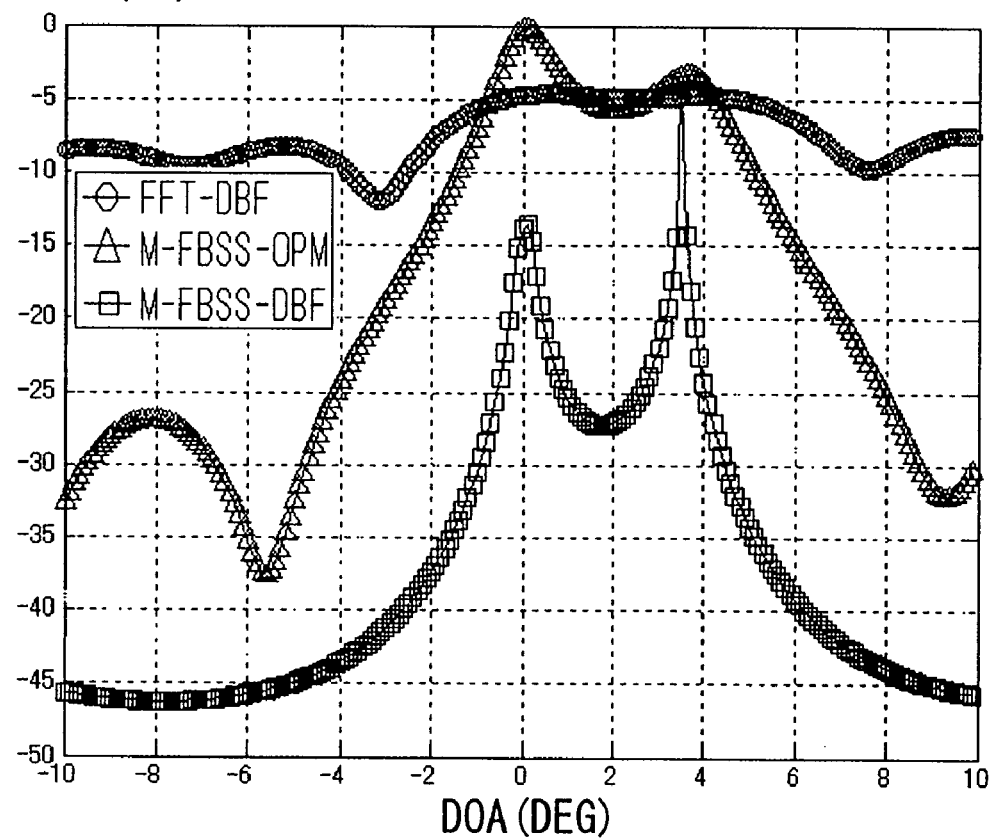
FIGS. 4(A) and 4(B) are diagrams of two-dimensional angle distributions showing the results of the DOA estimations according to the prior art and the present invention.

On the other hand, FIG. 3(E) shows a result given by an FFT-DBF method defined commonly accepted as a present on-vehicle method, FIG. 3(F) shows a result given by the FBSS-MUSIC method again, FIG. 3(G) shows a result given by an M-FBSS-OPM method, and FIG. 3(H) shows a result given by a method (shown by M-FBSS-DBF) according to the present invention. In comparison between these methods, the method capable of clearly specifying the two targets is only the method (M-FBSS-DBF) illustrated in FIG. 3(H) according to the present invention. Further, FIGS. 3(A)-3(G) illustrate that many white portions are interspersed other than the positions where the targets originally exist and that misdeterminations are made other than the case to which the present invention is applied. Note that the white portions in the vicinity of 0-10 bin, which appear in all of FIGS. 3(A)-3(H), occur due to a defect in a testing apparatus and have no relationship with the respective methods. FIG. 4 is a graphic chart showing profiles when sliced in round from an upper part down to a lower part on the sheet surface in the bin position (at the 40 m distance from the radar) in which the targets exist according to the methods shown in FIGS. 3(E)-3(H), wherein the angle is taken along the axis of abscissa (which is the same as in FIG. 3), and the spectrum is taken along the axis of ordinate (which is the Z-axis shown in FIG. 3). Then, FIG. 4(A) shows results of calculations based on the respective methods in the case of placing the two targets separated at 0 to 3 degrees at the 40 m distance from the radar, and FIG. 4(B) shows results of the calculations based on the respective methods in the case of placing the two targets separated at 0 to 2 degrees at the 20 m distance from the radar.

Figure 4B:
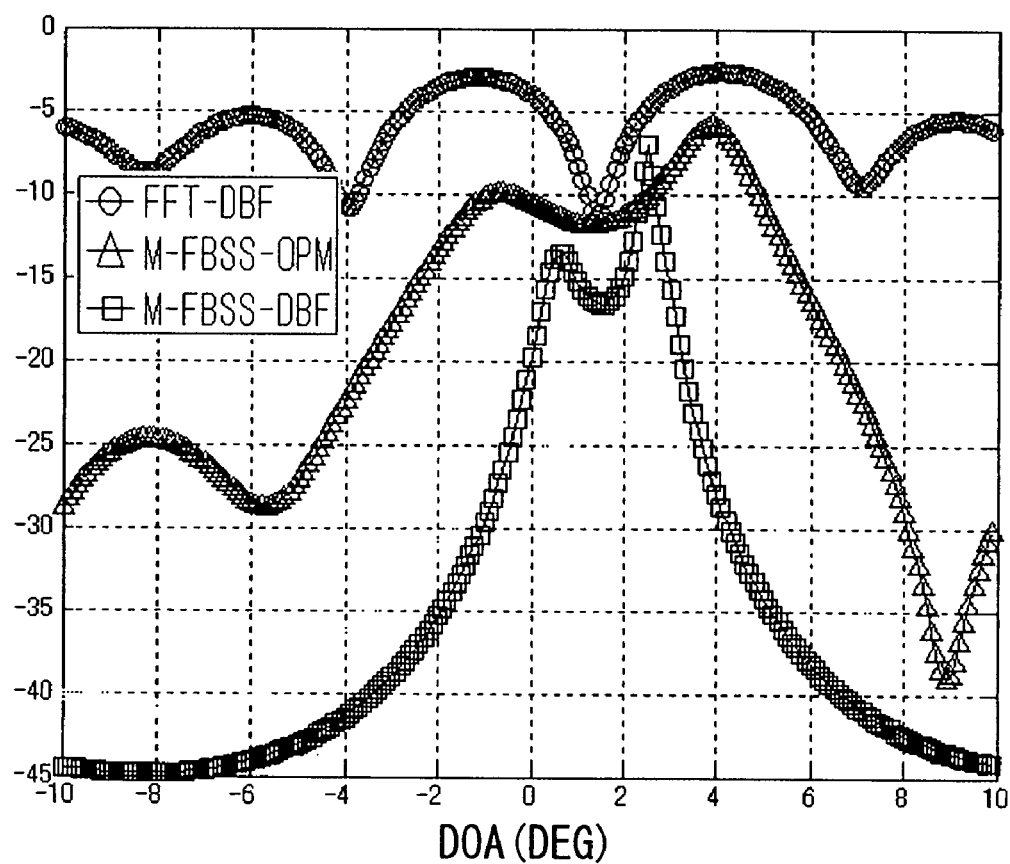

It is understood from FIG. 4 that a profile according to the present invention (M-FBSS-DBF) plotted by squares in FIG. 4 shows a spectrum peak extremely sharply observed in the position specifying the target while a pseudo peak is not observer, and gives extremely high accuracy. Especially in the target position illustrated in FIG. 4(B), the profile in which the spectrum peak is observed in the position specifying the target is only the profile according to the present invention.

Thus, the DOA calculating unit 147 performs the scan of the mode vector $a(\theta)$ by use of the formula (2.10), whereby the DOA estimation exhibiting the higher accuracy than in the case of utilizing the conventional PROPAGATOR method can be done.

Moreover, the variety of operations are executed in the frequency domain according to the third embodiment, and therefore the position information of the target may also be detected from the matrix S shown in the formula (2.7), or the matrix corresponding to the S matrix in the modified example of the second embodiment, or the respective matrixes included in the formula (2.6) (including the formulae (2.6.1) and (2.6.2)), or the norms (magnitudes (absolute values)) of the proper submatrixes thereof (which correspond to a position estimating unit according to the present invention).

Figure 6:
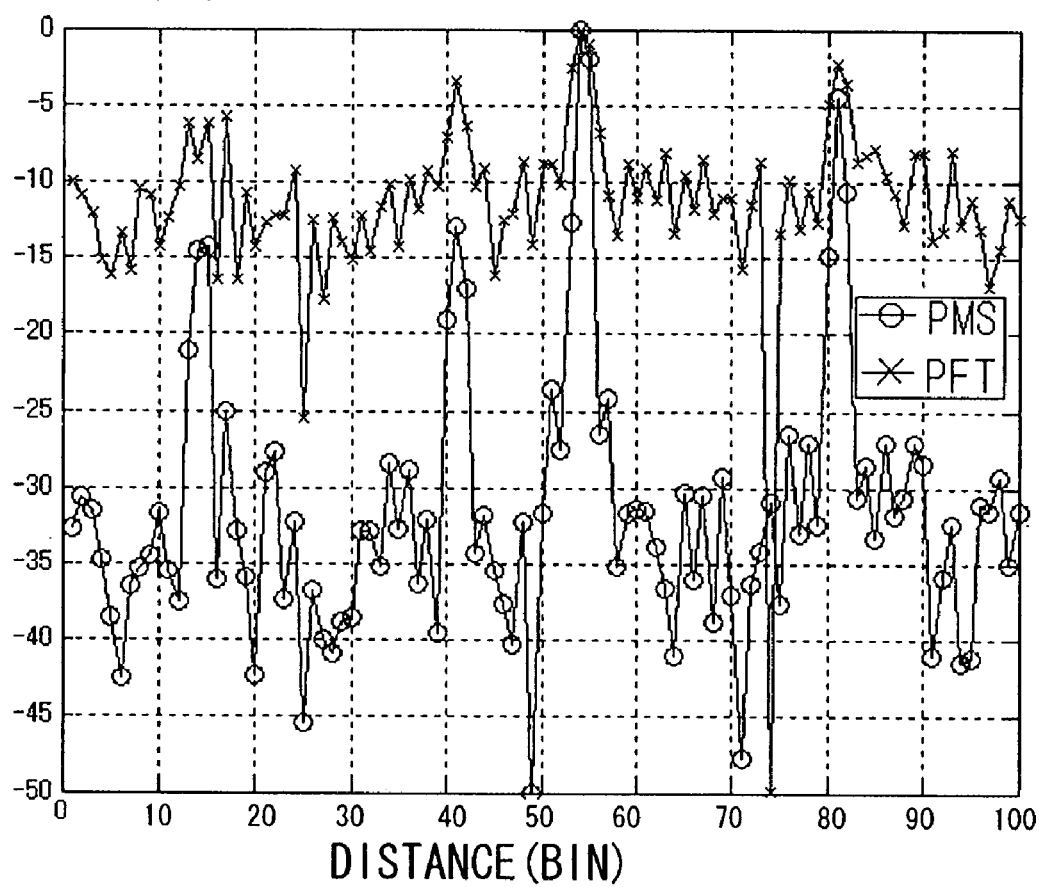
FIG. 6 is a graph showing results of detecting a distance position of an angle measuring target according to the prior art and the present invention.
Figure 7:
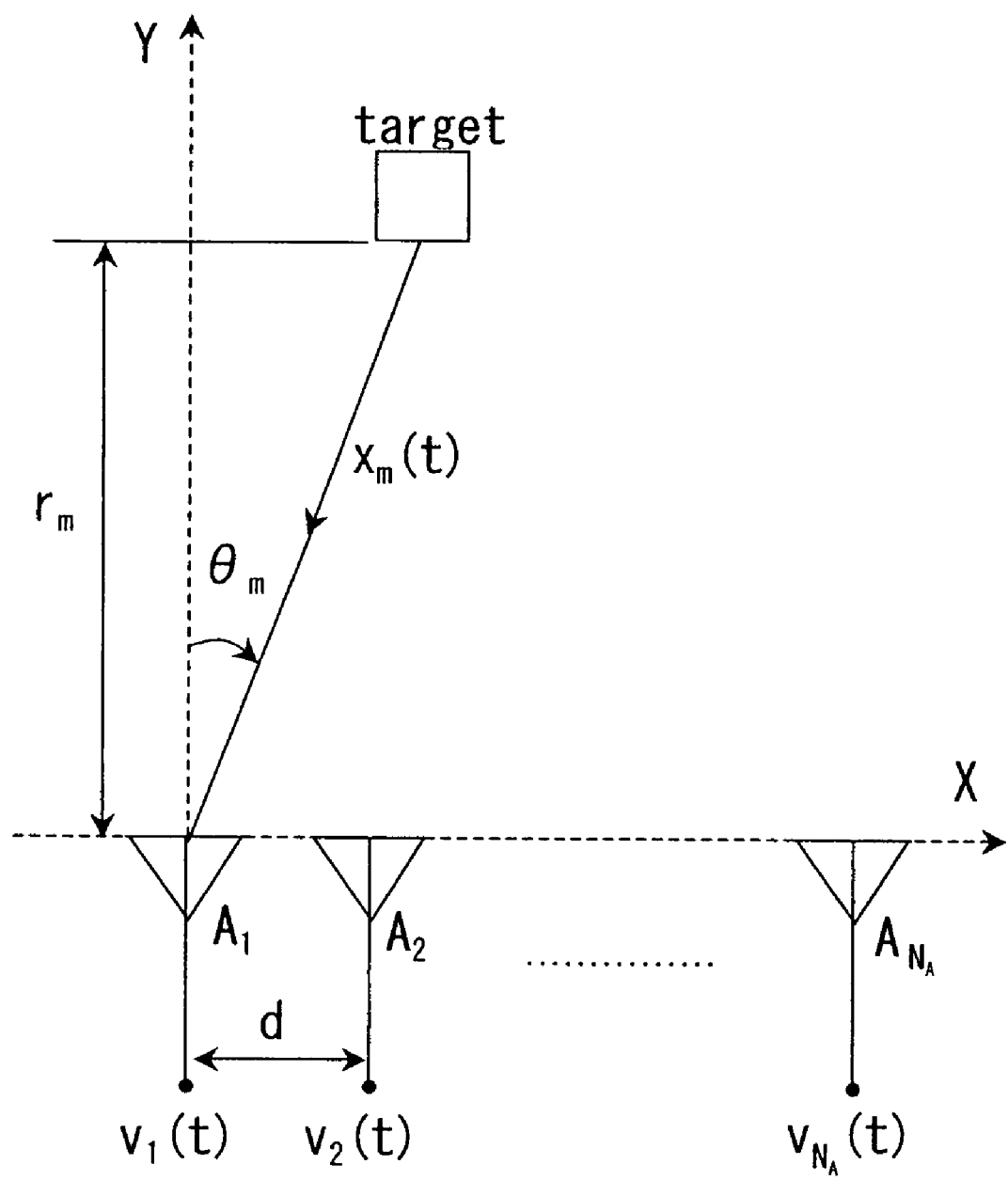
FIG. 7 is a conceptual diagram of the DOA estimation of arriving waves by use of array antennas.

FIG. 6 shows results of detecting the position of the target by use of the matrix S. In FIG. 6, the axis of ordinate shows the spectrum and the axis of abscissa shows the distance (bin). Then, in FIG. 6, a profile plotted by "x" represents the result in the case of utilizing the FFT, and a profile plotted by "O" represents the result in the case of using the matrix S. It is recognized from FIG. 6 that the profile in the case of using the matrix S shows the spectrum peak that is extremely sharply observed with the high accuracy while the pseudo peak is not observed.

What is claimed is:

1. A direction-of-arrival estimation device comprising:
   a plurality of sensors receiving arriving signals by reflection of transmission signals from a target to be measured and including at least a first sensor and a second sensor;

a receiving unit configured to generate baseband signals from the arriving signals received by said plurality of sensors;

a matrix forming unit configured to form a pseudo spatial average covariance matrix R without auto correlation elements by combining first correlation vectors between the baseband signal generated from the arriving signal received by the first sensor and respective baseband signals generated from the arriving signals received by said plurality of sensors except the first sensor, and second correlation vectors between the baseband signal generated from the arriving signal received by the second sensor and respective baseband signals generated from the arriving signals received by said plurality of sensors except the second sensor; and an estimation unit configured to estimate a direction of arrival of the arriving signal from an angle distribution or an algebraic equation by use of $(RR^H)^{-1}$, where "$H$" represents complex conjugate transposition, and "$-1$" represents an inverse matrix, based on the pseudo spatial average covariance matrix R.

2. A direction-of-arrival estimation device according to claim 1, further comprising a first submatrix forming unit configured to obtain $R_1 R_1^H$ based on a first submatrix $R_1$ of the pseudo spatial average covariance matrix $R_1$, corresponding to the signal count of the arriving signals, wherein said estimation unit estimates, when making a rough estimation of which estimation accuracy is low, the direction-of-arrival by use of $(RR^H)^{-1}$ and estimates, when making a detail estimation of which the estimation accuracy is high, the direction-of-arrival by use of a value obtained by subtracting $(R_1 R_1^H)^{-1}$ from $(RR^H)^{-1}$.

3. A computer readable medium having a program stored therein for causing a computer to execute a direction-of-arrival estimation of arriving signals received by a plurality of sensors by reflection of transmission signals from a target, and causing the computer to execute:

generating baseband signals from the arriving signals received by said plurality of sensors;

forming a pseudo spatial average covariance matrix R without autocorrelation elements by combining first correlation vectors between the baseband signal generated from the arriving signal received by the first sensor and respective baseband signals generated from the arriving signals received by said plurality of sensors except the first sensor, and second correlation vectors between the baseband signal generated from the arriving signal received by the second sensor and respective baseband signals generated from the arriving signals received by said plurality of sensors except the second sensor; and estimating a direction of arrival of the arriving signal from an angle distribution or an algebraic equation by use of $(RR^H)^{-1}$, where "$H$" represents complex conjugate transposition, and "$-1$" represents an inverse matrix, based on the pseudo spatial average covariance matrix R.

4. The computer readable medium having the program stored therein for causing the computer to execute the direction-of-arrival estimation of arriving signals received by a plurality of sensors by reflection of transmission signals from a target according to claim 3, further causing the computer to execute obtaining $R_1 R_1^H$ based on a first submatrix $R_1$ of the pseudo spatial average covariance matrix R, corresponding to the signal count of the arriving signals, wherein when estimating the direction-of-arrival, in the case of making a rough estimation of which estimation accuracy is low, the direction-of-arrival is estimated by use of $(RR^H)^{-1}$ and, in the case of making a detail estimation of which the estimation accuracy is high, the direction-of-arrival is estimated by use of a value obtained by subtracting $(R_1 R_1^H)^{-1}$ from $(RR^H)^{-1}$.

* * * * *